Oct. 28, 1969     J. S. ECKERT     3,474,597
GAS-LIQUID CONTACTOR

Filed Feb. 1, 1967                     4 Sheets-Sheet 3

INVENTOR.
JOHN S. ECKERT
BY
ATTORNEY

Oct. 28, 1969  J. S. ECKERT  3,474,597
GAS-LIQUID CONTACTOR
Filed Feb. 1, 1967  4 Sheets-Sheet 4

INVENTOR.
JOHN S. ECKERT
BY
*Jadon C. Mask*
ATTORNEY

United States Patent Office 3,474,597
Patented Oct. 28, 1969

3,474,597
GAS-LIQUID CONTACTOR
John S. Eckert, Silver Lake, Ohio, assignor, by mesne assignments, to Norton Company, a corporation of Massachusetts
Filed Feb. 1, 1967, Ser. No. 613,219
Int. Cl. B01d 47/18, 47/02
U.S. Cl. 55—231                8 Claims

ABSTRACT OF THE DISCLOSURE

One or more contactors are located centrally in a treating tower to provide one or more contactor stages. Gas rises through the tower as liquid flows down through it. Each contactor stage comprises (1) a pumping section, (2) a turbulent mixing section and usually (3) a separation section. In the pumping section the gas and liquid are separately introduced centrally of the tower and are caused to flow outward by kinetic energy separately imparted to them by mechanical means. In the mixing section the liquid flows downwardly in inwardly directed troughs and the gas impinges on the liquid in the troughs and is turbulently mixed with it. In the third section, the gas is separated from the liquid by baffles or the like, although the separation may be affected in separate equipment. The turbulent mixing of the gas as it is blown against the liquid flowing down through the troughs results in greatly increased and rapid mass or heat transfer between the gas and liquid phases.

---

The contactor of this invention is located in a treating tower. One or more contactors serve as one or more contactor stages in the tower. Gas rises in the tower; liquid flows down through the tower; and each contactor stage brings the gas and liquid into intimate turbulent contact. There will be as many contactor stages in a tower as are required to effect the desired stages of distillation. Each contactor stage will accomplish approximately one theoretical stage of distillation.

The contactor comprises a central pumping section surrounded by a mixing section in which the gas is impelled against the liquid as it flows down through troughs. The mixing section is usually surrounded by a separation section usually provided with baffles or other means for facilitating the separation of the gas from the liquid. An impeller in the pumping section is divided by a relatively horizontal partition into an upper section which serves as a liquid impeller and a lower section which serves as a gas impeller or blower. The liquid impeller throws the liquid against a plurality of inwardly facing and downwardly directed troughs. Usually the troughs are substantially vertical. The gas is impelled outwardly by the gas impeller against the liquid as it drains down in the troughs and mixes with it under conditions of extreme turbulence. In a preferred design, the trailing edges of the troughs coincide with the outer edges of the gas impeller blades which tend to stiffen the troughs. The mixing section advantageously includes baffles around the troughs which keep the gas and liquid in turbulent contact as they are driven centrifugally outward between and/or under the troughs.

The gas and liquid usually pass outwardly from the mixing section of the contactor into the separation section which is usually provided with baffles. Alternatively, the separation of the gas and liquid may be affected in separate equipment. The type, location and structure of the baffles may vary widely. They are not essential. In a preferred design, inner baffles extend down from the roof of the contactor and up from its floor in the mixing section, and in the separation section there are at least two annular baffles which extend downwardly and outwardly from the roof of the contactor, near its periphery, with openings in the roof between these baffles for the upward escape of gas. After passing under these latter baffles, most or all of the liquid is expelled through an opening at the periphery of the contactor stage and drains to the next lower contactor stage or is drained from the tower. Packing elements may be employed as baffles in the mixing section to maintain turbulent contact between the gas and liquid, and this is particularly advantageous if the liquid is viscous.

The invention is further described in connection with the accompanying drawings, in which.

Figure 1:
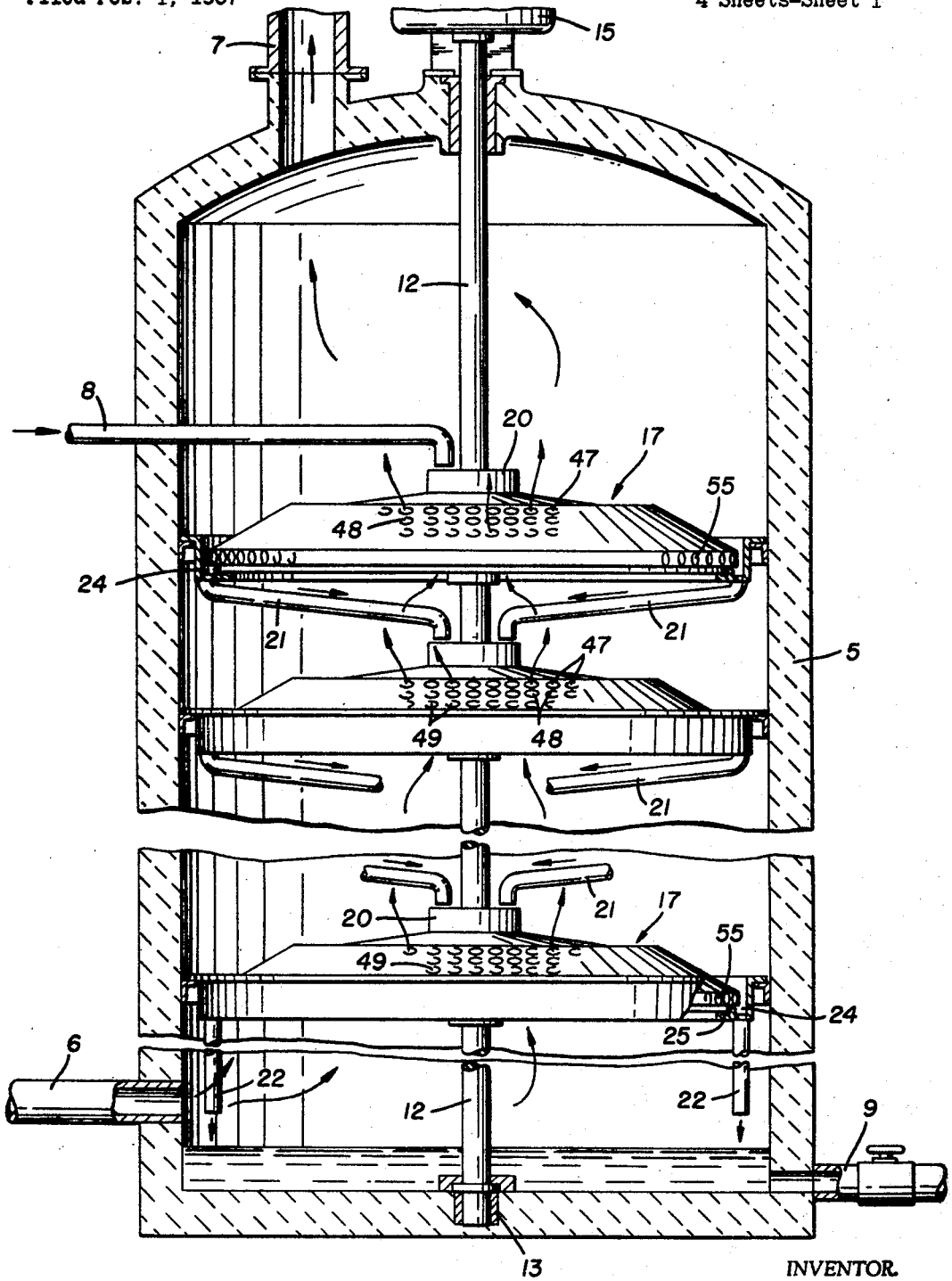
FIGURE 1 is a vertical section through a treating tower which comprises a plurality of contactor stages which may be identical or vary in design.
Figure 2:
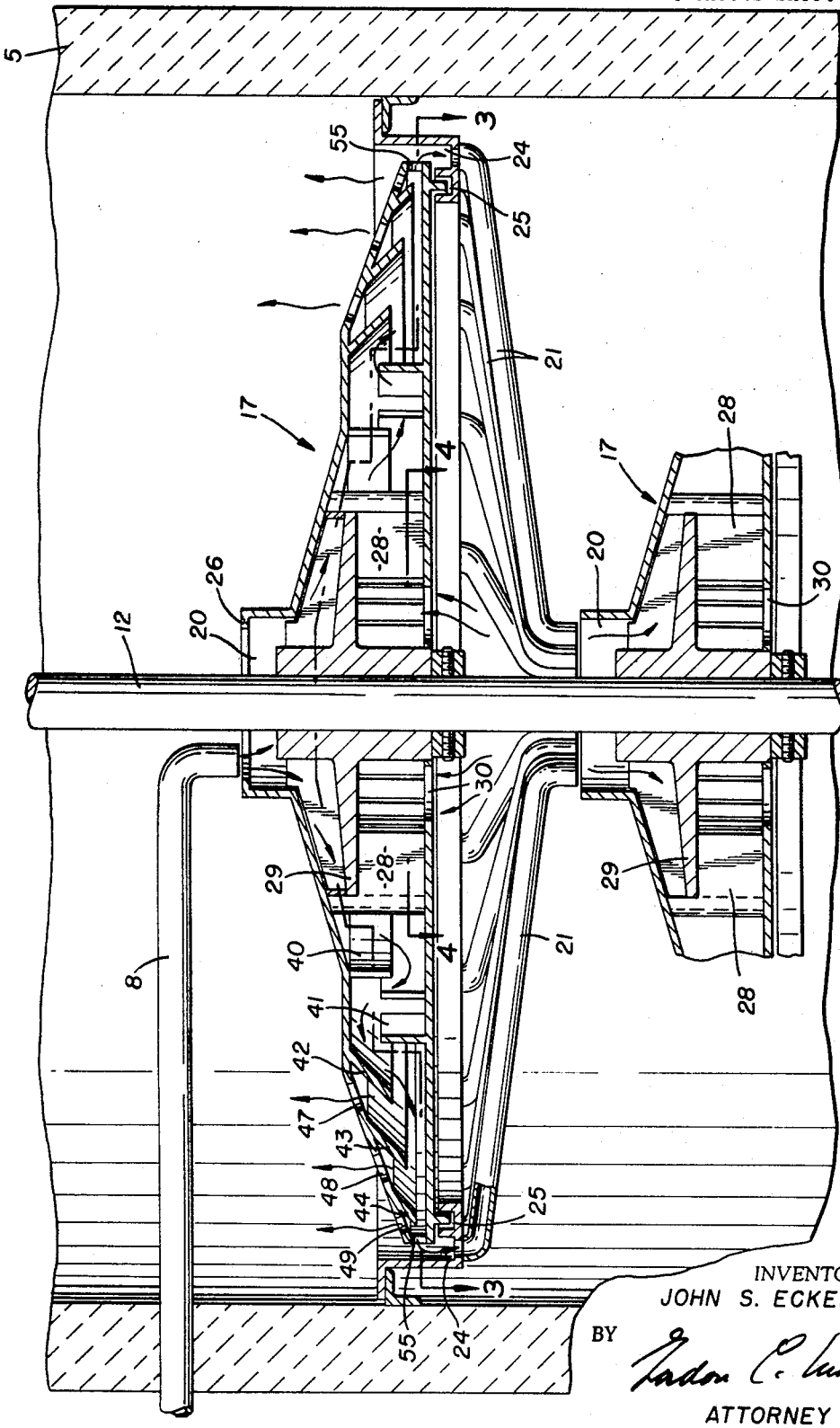
FIGURE 2 is a vertical section through one of the contactor stages, on an enlarged scale, and shows the two-story impeller.
Figure 3:
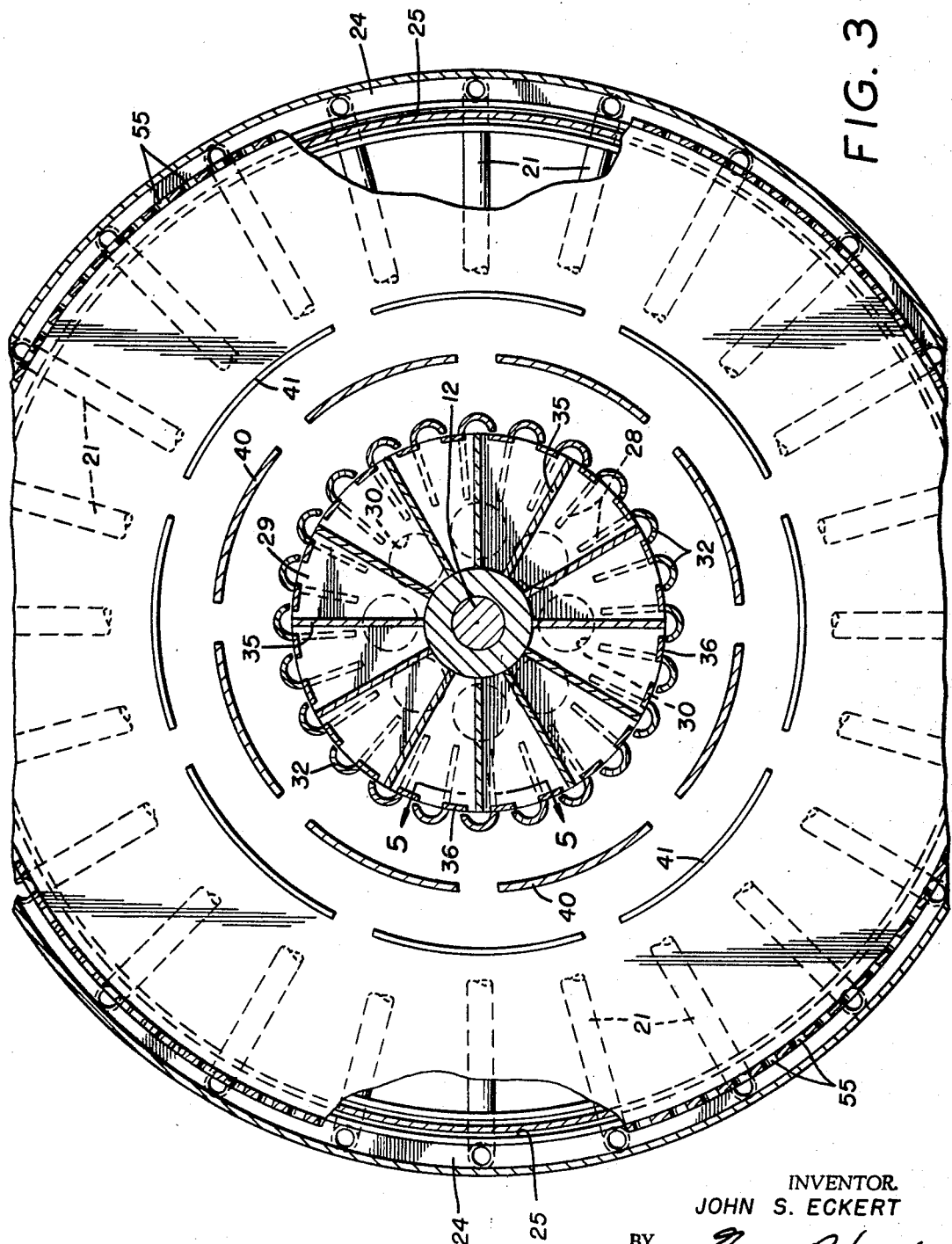
FIGURE 3 is a horizontal section on line 3—3 of FIGURE 2.
Figure 4:
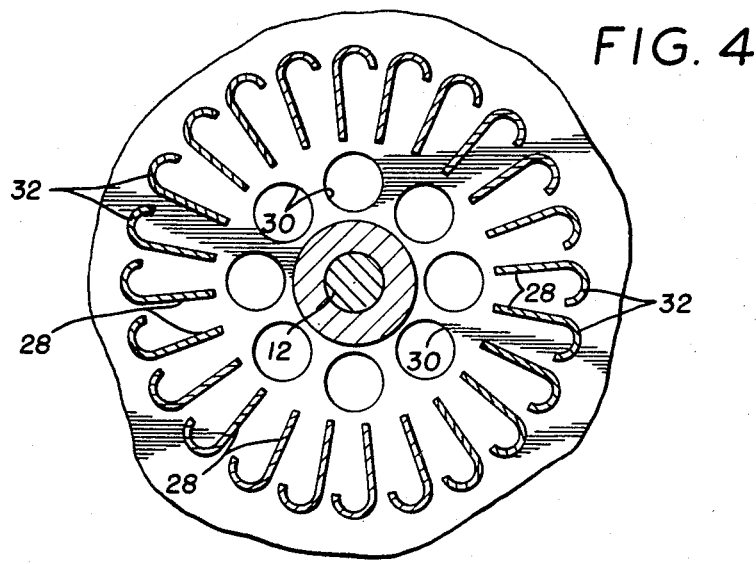
FIGURE 4 is a horizontal section through the pumping section of the contactor stage and the troughs on line 4—4 of FIGURE 2.
Figures 5, 6:
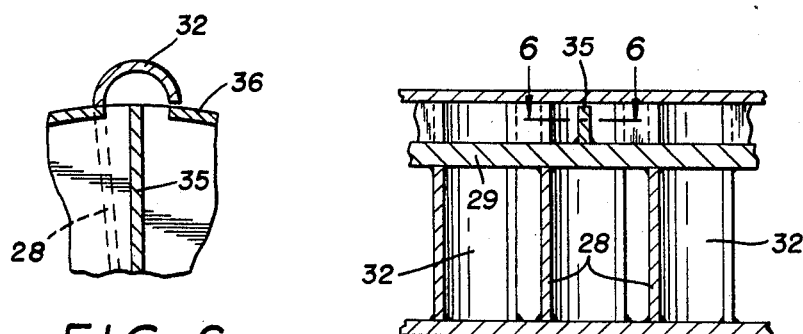
FIGURE 5 is a vertical section through the pumping section on line 5—5 of FIGURE 3.
FIGURE 6 is a horizontal section on line 6—6 of FIGURE 5.

The tower 5 is usually cylindrical, and the wall is composed of steel, concrete or other suitable material. It is provided with a gas inlet 6, gas outlet 7, liquid inlet 8 and liquid outlet 9. The central shaft 12 rests in bearing 13 and is provided at its upper end with sheave 15 to be driven by a belt. Other drive means may be utilized.

Any suitable number of contactor stages 17 are supported on the shaft. In the top contactor stage it is usual to supply all of the liquid through a single pipe 8 into the central open top 20 of this stage. In lower stages a number of liquid feed pipes 21 are usual. These serve as drains from the several stages, except that a vertical drain 22 from the bottom contactor stage is customary. The pipes 21 and 22 draw off liquid from the gallery 24 at the periphery of each contactor stage, and may be permanently attached to the tower in which case some sort of gas seal 25 is provided inside of this gallery. A lip 26 around opening 20 is usual to prevent liquid form being thrown centrifugally out of the opening.

The blades 28 of the gas impeller are usually vertical, but may be at an angle and are of any suitable shape. The gas and liquid portions of the impeller are separated by the substantially horizontal partition 29. Openings 30 are provided in the bottom of each contactor stage for the entry of all of the gas rising through the tower. The shape of these openings is not critical and they may be replaced by an annular opening, etc. A multiplicity of openings is preferred because the metal between the openings serves to stiffen the contactor. Vertical, inwardly facing troughs 32 extend from the leading edges of the respective blades 28. Alternatively, the troughs may be formed as separate elements, and they may cup around these edges. The gas is impelled outwardly from the pumping section against the troughs in the mixing section, and preferably the trailing edge of each trough coincides with the outer edge of a blade, so that the gas impelled radially outward against the blade, sweeps in and then out across the inwardly facing surface of the trough adjoined to it and mixes with the liquid which is flowing down over it.

The liquid is delivered on to the rotating, generally horizontal partition 29 which separates the gas and liquid impellers. Radiating or other vanes 35 on the partition throw the liquid outward. It is caught by the shroud 36 and directed into the troughs. As the one or more contactor stages are rotated, the liquid is thrown out against the troughs and as it drains down over them, the gas is impelled against the liquid and throws it outward over the edges of the troughs as a turbulent mixture of gas and liquid. There is intense agitation of the liquid and gas, as they move outward over the inner baffles which are included in the mixing section. A large turbulent surface of the liquid is exposed to the turbulent gas, and there is either effective heat interchange or effective transfer of mass of the gas to the liquid, or from the liquid to the gas resulting in very rapid approach to equilibrium.

Surrounding the pumping center of the contactor are several baffles. The baffle 40 which depends from the roof and the baffle 41 which rises from the floor maintain turbulent flow of the gas-and-liquid mixture as it is forced centrifugally outward toward the baffles in the separation section of the contactor stage. The efficiency of the contactor at each stage is to large extent dependent upon the efficiency of this maintenance of turbulence and subsequent separation of the gas and liquid. The baffle 41 is shown as composed of separate portions and the collected liquid-gas mixture is impelled outward through the spaces between the portions. If this baffle is continuous, openings must be provided in its base to accommodate the outward flow of the collected liquid and gas.

In the separation section of the contactor, beyond the baffles 40 and 41, are outwardly slanting, depending baffles 42, 43 and 44. Between each two of these baffles are openings 47 and 48 for the upward escape of the gas. Beyond this is a further escape opening 49 for the rest of the gas. Any suitable number of such baffles and rows of escape openings are provided. The baffles serve as centrifugal separators to separate the gas and liquid so that a minimum amount of liquid is carried upward from each contactor stage by the gas.

The separated liquid is thrown outward and flows through openings 55 to the gallery 24. The liquid in gallery 24 drains through pipes 21 to the next lower contactor stage where it is brought into contact with gas rising from the next lower contactor stage.

The gas entering openings 30 and the liquid entering the opening 20 are one theoretical stage, out of equilibrium with one another. The gas and liquid leave each contactor stage in substantial equilibrium with each other.

The mechanical energy imparted by the impeller to the gas and liquid produces turbulent contact which achieves rapid equilibrium between the two. Much smaller equipment is required to effect the same results as are obtained in a much larger tower with conventional plates or beds of packing elements, etc. in distillation absorption, stripping, etc.

Figure 7:
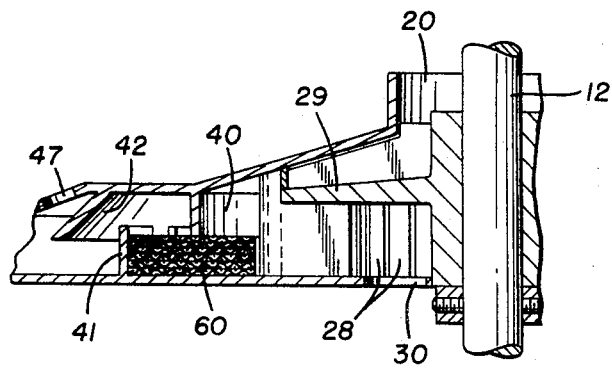
FIGURE 7 is a vertical section through the pumping and mixing sections of a modified contactor stage which contains packing to assist in maintaining turbulent contact between the gas and liquid.

FIGURE 7 is a section through a modified contactor stage in which a bed 50 of suitable packing elements assists in turbulently contacting the gas and liquid. This bed is composed of superimposed layers of wire mesh. Any suitable packing means may be used, and it may be located in any advantageous position. The addition of packing is particularly desirable for bringing about turbulent contact with viscous liquids.

The invention is covered in the claims which follow.

I claim:

1. A tower for bringing a gas and liquid into contact, which tower comprises means for introducing gas into the bottom of the tower, and removing it from the top; means for introducing a liquid into the top of the tower and removing it from the bottom; a vertical shaft with means for rotating the same; at least one contactor stage for bringing the gas and liquid into contact which contactor stage is supported by the shaft and rotates with it; in the contactor stage, a central pumping section about the shaft, which section comprises an impeller fastened to the shaft which impeller is divided by a horizontal partition into a liquid impeller portion above the partition and a gas impeller portion below it, said gas impeller having blades, there being openings at the bottom of the gas impeller portion for the entrance of the gas and an opening above for supplying liquid to the partition; downwardly directed, inwardly-facing troughs located outwardly adjacent the blades of the gas impeller portion and means above the partition which directs liquid into the troughs.

2. The tower of claim 1 in the contactor stage of which there are baffles which surround the troughs.

3. The tower of claim 2 in the contactor stage of which there are baffles nearer the pumping section which extend down from the top of the contactor stage and up from its bottom, and around these baffles there are other baffles which extend downwardly and outwardly from the top of the contactor stage and there are openings in the top of the contactor stage between these latter baffles for the escape of the gas from the contactor stage.

4. The tower of claim 1 in the contactor stage of which there is packing immediately outwardly from the troughs.

5. The tower of claim 1 in the contactor stage of which, the trailing edge of a trough is a continuation of an impeller blade of the gas impeller portion.

6. A gas and liquid contactor assembly having a central axis; an outer periphery spaced therefrom; a pumping zone surrounding said axis and extending outwardly therefrom to a pumping zone periphery spaced from the outer periphery of said contactor assembly; the remaining area between the pumping zone periphery and the outer periphery of said contactor assembly, being divided into at least two circumferential zones one of which is a gas-liquid mixing zone having an inner edge contiguous to said pumping zone periphery, and the other of which is a gas-liquid separating zone having an outer edge contiguous to the outer periphery of said contactor assembly; gas inlet means communicating with said pumping zone at the bottom of said pumping zone, and liquid inlet means communicating with said pumping zone at the top of said pumping zone; partition means in said pumping zone operative to maintain as separate streams, gas and liquid introduced therein; impeller means within said jumping zone operative to direct said gas and liquid streams radially outwardly of said pumping zone along separate, parallel paths; trough means vertically disposed adjacent the inner peripheral edge of said gas-liquid mixing zone, operative to divert said liquid stream downwardly, across the path of said gas stream, thereby to effect an intimate comingling of said streams; gas outlet means communicating with said gas-liquid separating zone operative to pass gas upwardly out of said zone and separate liquid outlet means communicating with said gas-liquid separating zone operative to pass liquid downwardly out of said zone.

7. The gas and liquid contactor assembly as defined in claim 6 wherein said gas-liquid mixing zone is provided with baffle means spaced radially outwardly of said trough means to effect a further comingling of said gas and liquid streams.

8. The gas and liquid contactor assembly as defined in claim 6 wherein said gas-liquid separating zone is provided with baffle means disposed angularly downward toward the outer periphery of said contactor assembly to effect a separation of gas and liquid prior to discharge.

(References on following page)

References Cited

UNITED STATES PATENTS

| | | |
|---|---|---|
| 1,232,464 | 7/1917 | Houghton _____ 55—407 |
| 1,862,069 | 6/1932 | Subkow _____ 261—28 |
| 2,195,707 | 4/1940 | Nutting _____ 55—237 X |
| 2,373,330 | 4/1945 | Nutting. |
| 2,941,872 | 6/1960 | Pilo et al. |

FOREIGN PATENTS 283,975  12/1928  Great Britain.

RONALD R. WEAVER, Primary Examiner

U.S. Cl. X.R.

55—257; 261—28, 84